United States Patent
Reichinger et al.

(10) Patent No.: US 6,912,912 B2
(45) Date of Patent: Jul. 5, 2005

(54) PRESSURE SENSOR HAVING AN OPTICAL WAVEGUIDE AND METHOD FOR PRESSURE DETECTION

(75) Inventors: Gerhard Reichinger, Rednitzhembach (DE); Georg Kodl, Nürnberg (DE)

(73) Assignee: Leoni Bordnetz-Systeme GmbH & Co. KG, Nuremberg (DE)

( * ) Notice: Subject to any disclaimer, the term of this patent is extended or adjusted under 35 U.S.C. 154(b) by 0 days.

(21) Appl. No.: 10/916,041

(22) Filed: Aug. 11, 2004

(65) Prior Publication Data

US 2005/0005706 A1 Jan. 13, 2005

Related U.S. Application Data

(63) Continuation of application No. PCT/EP03/01300, filed on Feb. 10, 2003.

(30) Foreign Application Priority Data

Feb. 11, 2002 (DE) .......................................... 102 05 594

(51) Int. Cl.⁷ ................................................. G01L 1/24
(52) U.S. Cl. ............................... 73/800; 73/788; 356/32
(58) Field of Search ......................... 73/763, 788, 800, 73/862.324, 862.325, 862.624; 356/32

(56) References Cited

U.S. PATENT DOCUMENTS

| | | | |
|---|---|---|---|
| 3,051,003 A | | 8/1962 | Witt |
| 4,418,981 A | * | 12/1983 | Stowe ........................ 356/477 |
| 4,566,135 A | | 1/1986 | Schmidt |
| 4,735,212 A | * | 4/1988 | Cohen ........................ 356/419 |
| 4,830,461 A | | 5/1989 | Ishiharada et al. |
| 4,901,584 A | | 2/1990 | Brunner et al. |
| 4,915,473 A | | 4/1990 | Haese et al. |
| 4,937,029 A | | 6/1990 | Ishiharada et al. |
| 5,004,913 A | * | 4/1991 | Kleinerman ................. 356/136 |
| 5,526,112 A | * | 6/1996 | Sahagen ...................... 73/715 |

FOREIGN PATENT DOCUMENTS

| | | |
|---|---|---|
| DE | 32 47 843 C1 | 12/1983 |
| DE | 34 43 949 A1 | 6/1986 |
| DE | 36 03 934 A1 | 8/1987 |
| DE | 38 02 527 A1 | 8/1988 |
| DE | 42 36 742 A1 | 5/1994 |
| DE | 195 37 383 A1 | 4/1997 |
| DE | 197 21 341 C2 | 11/1998 |
| DE | 198 01 961 A1 | 7/1999 |
| DE | 100 39 094 C1 | 2/2002 |
| EP | 0 327 964 A1 | 8/1989 |
| EP | 0 328 703 A1 | 8/1989 |
| GB | 2 141 821 A | 1/1985 |
| GB | 2 186 073 A | 8/1987 |
| JP | 59128009 A | 7/1984 |
| JP | 06102114 A | 4/1994 |

* cited by examiner

Primary Examiner—Edward Lefkowitz
Assistant Examiner—Alandra Ellington
(74) Attorney, Agent, or Firm—Laurence A. Greenberg; Werner H. Stemer; Gregory L. Mayback

(57) ABSTRACT

A pressure sensor includes an optical waveguide having an optical fiber with a refractive index n1, located in a fiber guide with a refractive index n3, forming an intermediate region. A medium with a refractive index n2 is located in the intermediate region. The refractive indices correspond to the relation n3>n1>n2. When subjected to a pressure, the fiber guide is pressed against the optical fiber such that the condition for the total reflection required for the normal optical waveguidance in the optical waveguide is no longer fulfilled, and attenuation takes place. The attenuation is evaluated in a corresponding control unit. The pressure sensor is especially provided for an anti-pinch device in the motor vehicle industry.

27 Claims, 5 Drawing Sheets

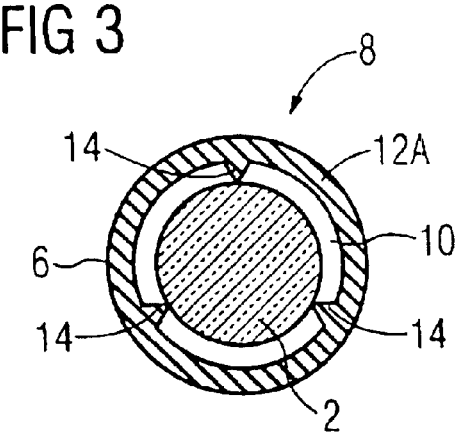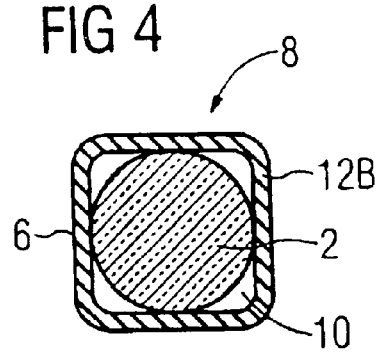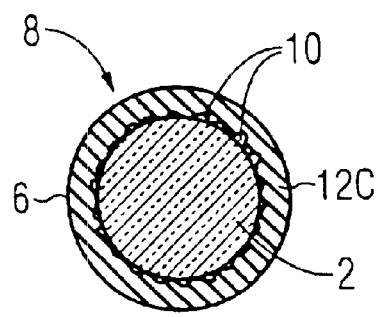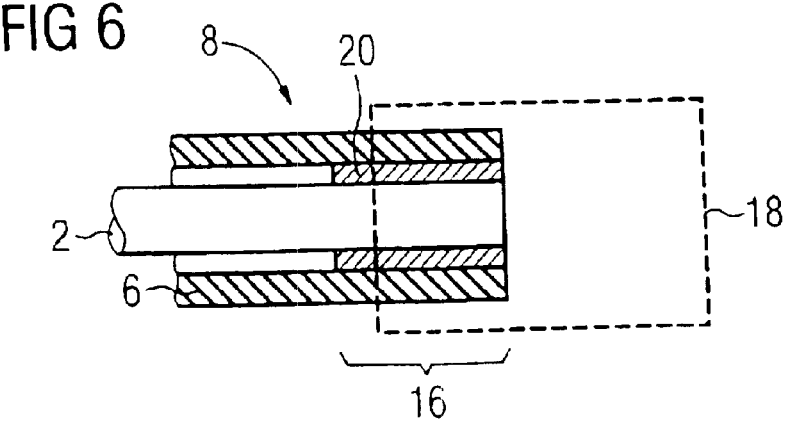

PRESSURE SENSOR HAVING AN OPTICAL WAVEGUIDE AND METHOD FOR PRESSURE DETECTION

CROSS-REFERENCE TO RELATED APPLICATION

This is a continuing application, under 35 U.S.C. §120, of copending international application No. PCT/EP03/01300, filed Feb. 10, 2003, which designated the United States; this application also claims the priority, under 35 U.S.C. §119, of German patent application No. 102 05 594.7, filed Feb. 11, 2002; the prior applications are herewith incorporated by reference in their entirety.

BACKGROUND OF THE INVENTION

Field of the Invention

The invention relates to a pressure sensor having an optical waveguide, which has an optical fiber with a refractive index of n1.

Pressure sensors such as these are disclosed, for example, in German Patent DE 197 21 341 C2, German Published, Non-Prosecuted Patent Application DE 42 36 742 A1, and German Published, Non-Prosecuted Patent Application DE 36 03 934 A1. In the known pressure sensors, light is fed into the optical waveguide and the attenuation of the light is used as a measure of the pressure load on the optical waveguide. This makes use of the characteristic of the optical waveguide that, when it is mechanically loaded, the optical waveguide is curved or bent so that its optical characteristic and, hence, its attenuation behavior, are changed. In particular, use is, in this case, made of the effect that the physical boundary condition for total internal reflection of the light within the optical waveguide is no longer satisfied when the optical waveguide is bent to a critical extent. Here, the majority of the light is emitted from the fiber. This leads to attenuation, which is detected by a suitable sensor and is used as a measure of the pressure load. One disadvantage in this case is that the pressure sensor has only a low level of sensitivity because the pressure sensor responds only to predetermined bending of the optical waveguide.

Pressure sensors such as these, in which the optical waveguide is deformed when pressure is applied, are also disclosed in U.S. Pat. No. 4,915,473 to Haese et al., JP 59128009, and German Published, Non-Prosecuted Patent Application DE 34 43 949 A1.

U.S. Pat. No. 4,735,212 to Cohen discloses a medical catheter with an internal optical waveguide. To detect a pressure, foamed sub-elements are incorporated, in particular, in the sheath or casing at predetermined points on the catheter, and are intended to transmit pressure to the optical waveguide, which is free of cladding only in these sub-areas.

SUMMARY OF THE INVENTION

It is accordingly an object of the invention to provide a pressure sensor having an optical waveguide, and a method for pressure detection that overcome the hereinaforementioned disadvantages of the heretofore-known devices of this general type and that provides a reliable pressure sensor and a reliable method for pressure detection.

With the foregoing and other objects in view, there is provided, in accordance with the invention, a pressure sensor, including an optical waveguide having a cladding-free optical fiber with a given refractive index, a flexible, tube-shaped, extruded sheath having locally limited support points, the optical fiber being disposed in the sheath and supporting the sheath thereon only at the locally limited support points to define an intermediate space therebetween surrounding the optical fiber, the optical fiber being disposed in the sheath surrounded by the intermediate space in an unloaded state of the sheath when no pressure is applied to the optical waveguide, a medium filling the intermediate space and surrounding the optical fiber, the medium having a refractive index less than the given refractive index, and the sheath being elastic and resting at least at a local point on the optical fiber when pressure is applied to the optical waveguide such that the propagation of light in the optical waveguide is attenuated even without deformation of the optical fiber.

With the objects of the invention in view, there is also provided a pressure sensor, including an optical waveguide having a loaded state and an unloaded state, a cladding-free optical fiber with a given refractive index, a flexible, tube-shaped, extruded sheath having support points, the fiber being disposed in the sheath to surround the fiber by an intermediate space in the unloaded state and to support the fiber in a locally limited manner only at the support points, the intermediate space containing a medium surrounding the fiber and having a refractive index less than the given refractive index, and the sheath being sufficiently elastic to rest on the optical fiber when pressure is applied in the loaded state and to attenuate light propagating through the fiber.

According to the invention, a pressure sensor has an optical waveguide, which has an optical fiber with a refractive index of n1, which is inserted in a sheath, which forms a fiber guide and is like a flexible tube, forming an intermediate space. A medium that surrounds the optical fiber and has a refractive index of n2 is located in the intermediate space. The fiber guide is configured such that it comes to rest on the optical fiber when pressure is applied. As a result, the light propagation through the optical fiber is attenuated. The sheath is supported at support points on the fiber, leaving the intermediate space free. The support points ensure that the intermediate space is maintained in the unloaded state. Furthermore, such a measure means that the pressure sensor, as such, can be produced comparatively easily, from the manufacturing point of view. In particular, the boundary conditions with respect to the refractive indices and the distance between the fiber and the sheath can be safely and reliably set. In the following text, the sheath is also referred to as a fiber guide.

This refinement is based on the idea that the physical precondition for total internal reflection in the optical waveguide is satisfied when the material or medium that surrounds the optical fiber has a lower refractive index than the fiber. Furthermore, the refinement of the pressure sensor is based on the discovery that the reflection that is required for light propagation does not occur exactly at the boundary surface between the optical fiber and the medium surrounding the fiber but, in fact, the light waves penetrate slightly into the outer area that is immediately adjacent to the optical fiber, and that the so-called evanescent field is formed here. The expression "optical fiber" means any medium that is suitable for the propagation of light. The cross-sectional geometry does not necessarily have to be round.

Against the background of this analysis, the pressure sensor is now configured such that, under the influence of pressure, the fiber guide enters the outer area with the evanescent field so that the evanescent field and, hence, the light propagation in the fiber are attenuated, and this attenuation is detected by a suitable sensor, in particular, a photodiode, as an indication of the pressure load, and is evaluated in an associated evaluation device.

The major advantage over conventional pressure sensors with optical waveguides is that there is no need for the optical waveguide to bend, in particular, for the optical fiber to bend. For the functionality of the pressure sensor, it is sufficient for the fiber guide to come into contact with the optical fiber. There is no deformation of the optical fiber. The pressure sensor, thus, operates even without any deformation of the optical fiber. This results in the pressure sensor having an improved response and it can detect even comparatively small pressure loads. Furthermore, such a pressure sensor also results in a considerably faster response because the pressure sensor reacts as soon as the fiber guide comes into contact with the optical fiber, and not only when the optical fiber is, itself, bent. This is advantageous, in particular, in safety areas, for example, for pinch protection in the case of a motor vehicle window.

In accordance with another feature of the invention, the fiber guide, preferably, has a refractive index greater than that of the optical fiber so that the condition for total internal reflection is no longer satisfied when the fiber guide touches the fiber. Consequently, the light propagating in the optical waveguide is emitted effectively and is attenuated.

In accordance with a further feature of the invention, for a simple configuration, the medium in the intermediate space is a gas and, in particular, is air.

In the unloaded state and when no pressure is applied—at least in large sub-areas—the fiber is at a distance of about 5 to 20 $\mu$m from the fiber guide. This distance corresponds to the typical penetration depth of the evanescent field into the outer area that surrounds the optical fiber. If the penetration depth is less, the distance may also be less than this, down to 1 $\mu$m. Such dimensions, therefore, reliably ensure total internal reflection in the unloaded state, while, at the same time, ensure as fast a response as possible. Furthermore, a comparatively compact construction is obtained. In accordance with an added feature of the invention, the pressure sensor is, preferably, configured to be pressure-sensitive largely over the entire length of the fiber.

In such a case, the sheath, preferably, has a rectangular cross-sectional area. The sheath is supported by its flat faces on the optical fiber, which has a round cross-section, only at locally limited points. The condition for total internal reflection is, admittedly, no longer satisfied at these local points, but the contact area is configured to be sufficiently small so that the attenuation resulting from this has no adverse effect on the method of operation of the pressure sensor. In particular, suitable adjustment measures, for example, calibration measures, can be used to take account of the attenuation associated with this, in the evaluation device. The intermediate space is formed in the corner areas between the circular fiber and the rectangular sheath.

As an alternative thereto, the sheath advantageously concentrically surrounds the fiber and has spacers with respect to the fiber, which carry out the function of the support points. These spacers are, for example, longitudinal ribs guided within the sheath, which is in the form of a flexible tube. To keep the contact area of the sheath through the spacers on the fiber as small as possible, they, preferably, taper toward the fiber. In particular, they are configured to have a cross-section in the form of a triangle. This keeps the attenuation caused by the spacers low. In general, with regard to the configuration of the sheath, it is advantageous for the sheath to have only as small a contact area as possible with the optical fiber in the unloaded state and for the sheath to be supported on the fiber as far as possible only at points or in a linear form, that is to say, in a locally limited form. A further development provides for the spacer to be formed from a different material to that of the sheath, with this material having a refractive index that satisfies the condition for total internal reflection so that no attenuation or only a very low level of attenuation takes place on the spacers.

As an alternative to the configuration with the sheath surrounding the fiber, in accordance with an additional feature of the invention, the fiber guide, preferably, has a surface roughness and sub-areas of it already rest on the fiber, even in the unloaded state and without any pressure being applied, with the intermediate space being ensured by the surface roughness. Such a refinement is based on the idea that the functionality of the pressure sensor is, likewise, ensured by suitable surface roughness, whose roughness depth should be in the range of the penetration depth of the evanescent field. This refinement allows a pressure sensor with a particularly low cost and simple construction.

In accordance with yet another feature of the invention, there is provided a sealing element, the sealing element forming the sheath.

In accordance with yet a further feature of the invention, the optical waveguide has an intermediate element at the end in a connecting area between the fiber and the fiber guide, which intermediate element prevents the fiber guide from being pressed against the fiber. This connecting area is, for example, a coupling area between two optical waveguides or, else, the area in which the light is injected into or output from the optical waveguide. The optical waveguide is, thus, coupled to a further optical element in this connecting area. Because the fiber guide necessarily has to be configured to be elastic, a risk in the connecting area of the fiber guide being pressed against the optical fiber resulted, thus, resulting in high attenuation in the connecting area. Such attenuation is prevented by the intermediate element.

In accordance with yet an added feature of the invention, the intermediate element is configured to substantially not attenuate light propagating in the optical fiber in the connecting area when pressure is applied. Similarly, the sheath can have a high optical attenuation in an alternative to having a refractive index greater than the refractive index of the fiber. Reduction in intensity of light conducted through the optical fiber can be obtained by having the sheath be of a black material, for example, which has a high absorption.

In accordance with yet an additional feature of the invention, the intermediate element, preferably, has a reflective layer and is, for example, a metal foil or a coated plastic sheet. The intermediate element can also be formed by application of a reflective layer to the fiber guide.

In accordance with again another feature of the invention, in particular, the intermediate element completely surrounds the fiber and has a refractive index that is lower than the refractive index of the optical fiber so that the condition for total internal reflection is satisfied.

In accordance with again a further feature of the invention, two or more fibers are provided for position-resolved detection of the application of pressure, in which light propagation in each of the fibers can be detected and evaluated mutually independently. The fibers are, preferably, laid and crossed over in the form of a grating or matrix, thus allowing resolution with virtually point precision. When two or more independent fibers are used, both two-dimensional and three-dimensional position-resolved detection are possible.

For the situation where pressure sensitivity is not desired over the entire length of the fiber, a deactivation element is provided in accordance with again an added feature of the invention, which element suppresses the pressure sensitivity in one sub-area when pressure is applied. The deactivation element is, for example, a small tube that is pushed over the fiber in the form of a sheath. If a flat fiber guide is used instead of the sheath according to the invention, such as in the form of a flexible tube, for example, a foam panel, then it is possible to use a flat deactivation element, such as a metal foil or a coated plastic sheet. The deactivation element is configured such that any attenuation when pressure is applied is suppressed as far as possible, and total internal reflection is ensured.

In accordance with again an additional feature of the invention, the pressure sensor is expediently in the form of a switching element and, for this purpose, has a pressure element. The pressure element may be in the form of a guide element or may press against the fiber when the guide element is operated. If it is in the form of a switching element, it is sufficient for the pressure sensitivity to be provided only in one small sub-area of the fiber, on which the pressure element acts. The light propagation in the fiber is, thus, subject to interference when the pressure element is operated. This interference is detected by the evaluation unit as "switching," which means it is possible to operate a further function, for example, switching an electrical load on or off.

In accordance with still another feature of the invention, for optical checking of the switching process, a portion of the light is, preferably, emitted from the fiber when the pressure element is operated, and is made visible. In particular, the pressure element is, itself, pressed against the fiber and is composed of a transparent material so that the pressure element is, itself, illuminated.

In accordance with still a further feature of the invention, the pressure sensor is, preferably, used in a motor vehicle. In general, the pressure sensor is suitable for use for pinch-protection apparatus in a motor vehicle area, machine construction, in lifts, for the detection of pressure loads by personnel, vehicles, or other pressure waves. By way of example, the pressure sensor may be integrated in car seats, as an identification system to determine whether or not anyone is occupying the car seat. Furthermore, the pressure sensor may, in particular, also be integrated in the area of the bumper bar of a motor vehicle to identify an impact quickly and at an early stage and, then, to initiate suitable measures. Because the pressure sensor allows even comparatively small pressure loads to be detected, it could be used to minimize the danger in the event of accidents involving people. For such a purpose, by way of example, provision is made for the engine hood of the motor vehicle to be raised without delay when the pressure sensor detects an impact to form a flexible impact surface, which dissipates energy.

In accordance with still an added feature of the invention, for a space-saving configuration, the pressure sensor is, expediently, integrated within a sealing element, for example, in a window seal, as part of a pinch-protection apparatus.

With the objects of the invention in view, there is also provided a method for detecting pressure, including the steps of extruding a sheath into a flexible tube shape, the sheath having support points, creating an optical waveguide by placing a cladding-free optical fiber with a given refractive index into the sheath to create an intermediate space between the fiber and the sheath surrounding the fiber in an unloaded state of the waveguide and supporting the fiber in the sheath in a locally limited manner only on the support points with the intermediate space being filed with a medium surrounding the fiber and having a refractive index less than the given refractive index, injecting light into the fiber to form an evanescent field within the intermediate space in an outer area of the fiber directly adjacent the fiber, when pressure is applied to the waveguide, moving the sheath into an outer area of the fiber to attenuate the evanescent field and, thereby, the light propagating in the fiber even without any deformation of the fiber and detecting the attenuation of the light propagating in the fiber.

With the objects of the invention in view, there is also provided a method for pressure detection, including the steps of providing an optical waveguide with a cladding-free optical fiber having a given refractive index, surrounding the fiber on all sides in a flexible, tube-shaped, extruded sheath and an intermediate space existing in an unloaded state of the waveguide and supporting the sheath on the fiber only at locally limited support points, surrounding the fiber in the intermediate space with a medium having a refractive index less than the given refractive index, injecting light into the fiber to form an evanescent field within the intermediate space in an outer area of the fiber directly adjacent the fiber, when pressure is applied to the waveguide, moving the sheath into an outer area of the fiber to attenuate the evanescent field and, thereby, the light propagating in the fiber even without any deformation of the fiber and detecting the attenuation of the light propagating in the fiber.

Other features that are considered as characteristic for the invention are set forth in the appended claims.

Although the invention is illustrated and described herein as embodied in a pressure sensor having an optical waveguide, and a method for pressure detection, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 3 is a cross-sectional view through an optical waveguide having a sheath that concentrically surrounds the optical fiber;

FIG. 4 is a cross-sectional view through an optical waveguide having a square sheath surrounding the optical fiber;

FIG. 5 is a cross-sectional view through an optical waveguide with a fiber guide that concentrically surrounds the optical fiber and has a high degree of surface roughness;

FIG. 6 is a fragmentary, longitudinal cross-sectional view through the optical waveguide in a connecting area;

DESCRIPTION OF THE PREFERRED EMBODIMENTS

Figure 1A:
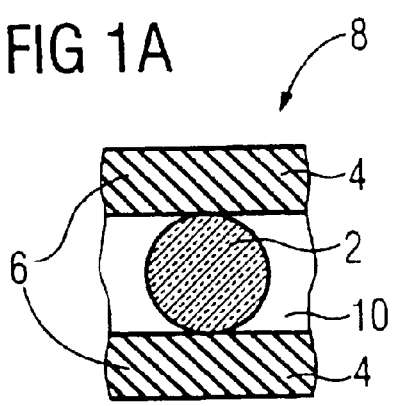
FIG. 1A is a fragmentary cross-sectional view through an optical waveguide in which an optical fiber is disposed between two elements in the form of panels in a state when no pressure is applied.
Figure 1B:
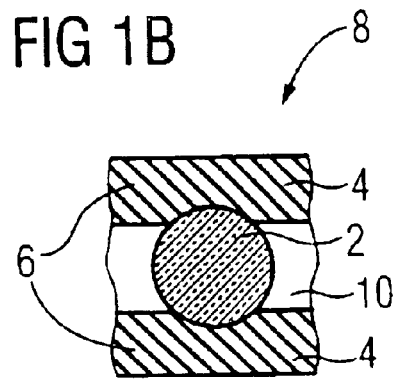
FIG. 1B is a fragmentary cross-sectional view through an optical waveguide in which an optical fiber is disposed between two elements in the form of panels in the state when pressure is applied.

Referring now to the figures of the drawings in detail and first, particularly to FIGS. 1A and 1B thereof, there is shown an optical fiber 2 is guided between two elements 4, which are in the form of panels and form an elastic fiber guide 6. The fiber guide 6 and the optical fiber 2 overall form the optical waveguide 8. In the unloaded state as illustrated in FIG. 1A when no pressure is applied, the elements 4 that are in the form of panels substantially rest in a linear form in the optical fiber 2 so that the optical fiber 2 is surrounded by an outer area, which acts as the intermediate space 10 and in which a gaseous medium, preferably, air, is provided. In contrast to conventional optical waveguides, for example, glass fibers or plastic fibers, which are provided, typically, with a cladding (a reflective coating having a smaller refractive index that the optical fiber to guarantee a total reflection and to minimize losses during light propagation by the optical fiber), the optical fiber 2 of the present invention is, therefore, not directly surrounded by a sheath, the so-called cladding.

The optical fiber 2 is, for example, a glass fiber or, else, a plastic fiber composed of PMMA or PU. The elements 4 that are in the form of panels are, for example, sealing elements and are composed of rubber or of a suitable plastic. The fiber 2 has a refractive index of n1, which is slightly greater than the refractive index n2 of the air in the intermediate space 10. At the same time, the refractive index n3 of the fiber guide 6, that is to say, of the elements 4 that are in the form of panels, is greater than the refractive index n1 of the fiber 2. The relationship n3>n1 is, in this case, not required. It is sufficient for the fiber guide 6 to be composed of a material that attenuates electromagnetic waves.

During operation of the pressure sensor, light is injected into the optical waveguide 8 on one side. A suitable light source, preferably, a light-emitting diode or a laser diode, is used for this purpose. A suitable light sensor, in particular, a photodiode, is disposed at the end of the optical waveguide 8, and is connected to an evaluation unit. The light that has been passed through the optical waveguide is detected in the light sensor and the attenuation is calculated in the evaluation unit, in comparison to the light fed in. In the unloaded state, as is illustrated in FIG. 1A, the condition for total internal reflection is satisfied at the boundary surface between the optical fiber and the intermediate space 10 so that the light is passed through the optical waveguide 8 substantially without any losses. Attenuation occurs only in the area of the linear contact surface with the fiber guide 6. However, this is comparatively small.

In the loaded state when pressure is applied, as is illustrated in FIG. 1B, the fiber guide 6 is pressed against the fiber 2 and merges closely with the fiber 2 due to its elasticity, thus, resulting in a comparatively large-area contact with guide 6. The conditions for total internal reflection are, therefore, no longer satisfied in the area of the contact surface between the fiber and the fiber guide 6, and the light or evanescent field is emitted or attenuated in the area of this contact surface. This leads to additional attenuation, which is detected by the evaluation unit. The important feature is that, for the functionality of this principle, no mechanical load is required on the optical fiber and, in particular, there is no need for the optical fiber 2 to be bent. Thus, the pressure sensor has a very fast and sensitive response.

Figure 2A:
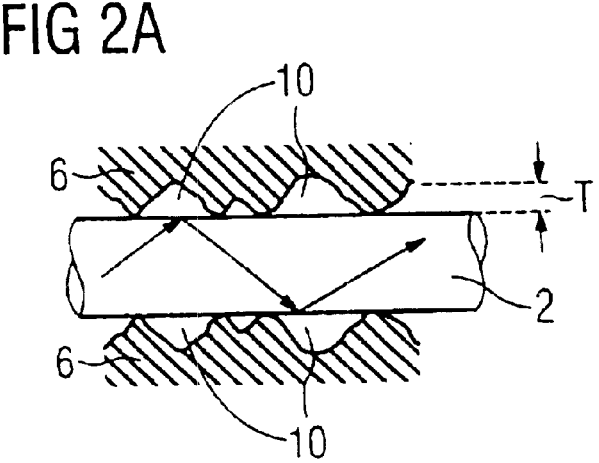
FIG. 2A is a fragmentary longitudinal cross-sectional view through an optical waveguide in which the optical fiber is directly surrounded by a fiber guide with a high degree of surface roughness in a state without pressure being applied.
Figure 2B:
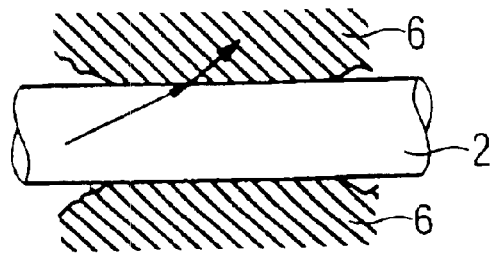
FIG. 2B is a fragmentary longitudinal cross-sectional view through an optical waveguide in which the optical fiber is directly surrounded by a fiber guide with a high degree of surface roughness in a state with pressure being applied.

The functional principle of the pressure sensor will be described once again with reference to FIGS. 2A and 2B, in which the fiber 2 is directly surrounded by a fiber guide 6, which has only a high degree of surface roughness with a roughness depth T. The roughness depth T in this case indicates, in particular, the mean roughness depth of the surface roughness. The surface roughness results in individual cavities being formed between the fiber 2 and the fiber guide 6, which carry out the function of the intermediate space 10. In the unloaded state as shown in FIG. 2A, the condition for total internal reflection is, therefore, satisfied over wide areas, as is illustrated schematically by the light beam path indicated by arrows. In such a case, for the sake of simplicity, the evanescent field is not illustrated, that is to say, the penetration of the light wave into the intermediate space 10 is not illustrated. The roughness depth T corresponds approximately to the penetration depth of the evanescent field, which is, typically, in the order of magnitude between 5 and 20 μm. When a pressure load is applied, the fiber guide 6 is pressed against the fiber 2 so that the condition for total internal reflection is, once again, interrupted and the light is emitted from the fiber 2, which leads to attenuation.

As can be seen from FIG. 3, the fiber 2 is sheathed by a concentric sheath 12A, leaving the intermediate space 10 free. The sheath 12A is supported on three spacers 14, which are each disposed rotationally offset through about 120°. The sheath 12A is separated from the fiber 2 by at least the same order of magnitude as the penetration depth of the evanescent field, that is to say, at least 5 to 20 μm. The spacers 14 have a cross-section with a triangular area, whose tip points toward the fiber 2. The spacers 14 extend in the longitudinal direction of the sheath 12A in the form of longitudinal ribs on its inner upper face. FIG. 3 schematically shows the spacers 14 being formed from a different material to that of the sheath 12A. The refractive index of the spacers 14 is less than that of the fiber 2. As an alternative thereto, the spacers 14 may also be formed from the same material as the sheath 12A, and may, for example, be produced in an extrusion process.

The optical waveguide shown in FIG. 4 has a sheath 12B that has a square cross-section and that rests in a linear form on the optical fiber 2 at four points in the unloaded state. The sheath 12B may also have a rectangular cross-sectional area so that it makes contact with two contact lines in the unloaded state.

As can be seen from FIG. 5, the fiber 2 is surrounded by a concentric sheath 12C, which has a high degree of surface roughness.

The embodiment variants shown in FIG. 3 to 5 have the common feature that the sheath 12A, 12B, 12C forms the fiber guide 6 and has a refractive index of n3, which is greater than the refractive index n1 of the fiber 2, or has optical attenuation. Furthermore, the sheath 12A, 12B, 12C, as well as the fiber guide 6, is generally composed of an elastic material so that the sheath 12A, 12B, 12C is pressed against the fiber 2 when a pressure load occurs and merges with it.

As can be seen from FIG. 6, a connecting area 16, in which the optical waveguide 8 is connected to a further optical element 18, is provided in the end area of the optical waveguide 8. The further optical element 18 is illustrated by dashed lines in FIG. 6 and is, for example, a light-emitting diode or, else, a photodiode. The optical element 18 may also be a coupling piece to a conventional optical waveguide, which is not in the form of a pressure sensor. This optical element 18 is generally attached to the optical waveguide 8 in the form of a plug. In such a case, the optical waveguide 8 is clamped normally in the element 18 to secure it reliably. To prevent the fiber guide 6 from pressing against the optical fiber 2 in the connecting area 16, the fiber 2 is surrounded by an intermediate element 20 in the exemplary embodiment shown in FIG. 6. The intermediate element 20 has a refractive index n4, which is less than the refractive index n1 of the fiber 2, thus, ensuring total internal reflection in this area as well and, as far as possible, avoiding attenuation. The intermediate element 20 is, for example, a Teflon sleeve. It may also be composed of metal or of a metallized plastic.

Figure 7:
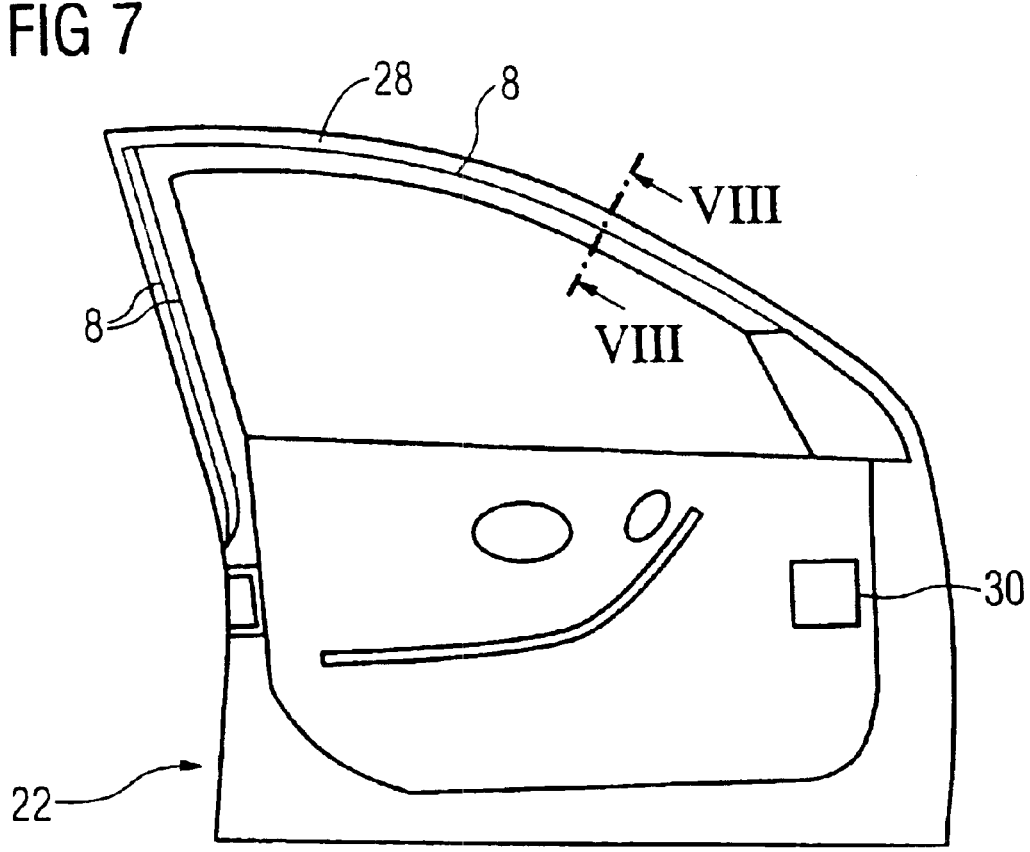
FIG. 7 is a side view of a motor vehicle door with a pinch-protection apparatus according to the invention.
Figure 8:
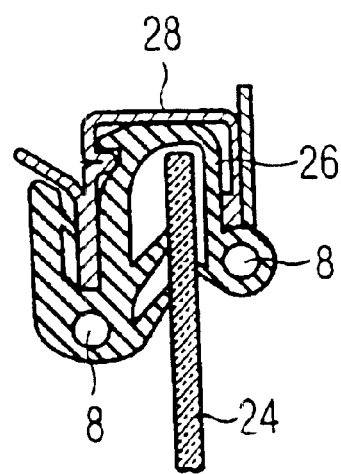
FIG. 8 is a fragmentary cross-sectional view of the door of FIG. 7 along section line VII—VII.

In one preferred field of use, FIG. 7 shows the use of the pressure sensor for a pinch-protection apparatus for a motor vehicle door 22. As can also be seen, in particular, in conjunction with FIG. 8, the optical waveguide 8, which is in the form of a pressure sensor, is routed on both sides of a windowpane 24, to be precise, with the optical waveguide 8 being integrated in a sealing element 26, which is used to seal the windowpane 24 within the door frame 28. In the exemplary embodiment, provision is made for the optical waveguide 8 to, first of all, be routed away and, then, back again, in the form of a loop in the sealing element 26. In this case, the light source with light sensor and an evaluation unit for determination of the degree of attenuation can be integrated in the control unit 30. As soon as an object becomes trapped between the windowpane 24 and the sealing element 26 or the door frame 28 while the windowpane 24 is being raised, the light that is being passed through the optical waveguide 8 is attenuated and the process of closing the window is stopped to prevent the possibility of injuries.

The pressure sensor may also be inserted in a holder, which is open at the top and is, for example, V-shaped in the end of a windowpane. The pressure sensor is externally accessible so that, for example, the raising of the windowpane is stopped by manual pressure with the hand. The pressure sensor, thus, acts like a type of "immersion sensor".

Figure 9:
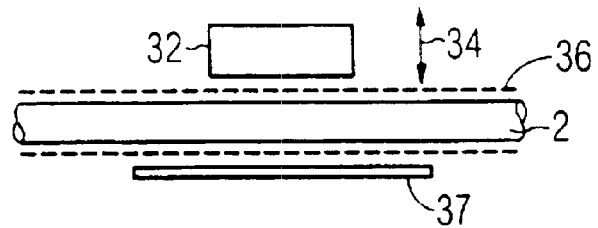
FIG. 9 is a fragmentary, cross-sectional view of an embodiment of the pressure sensor according to the invention as a switching element.

As can be seen from FIG. 9, a pressure element 32 is provided, which can be operated in the direction of the double-headed arrow 34 and, in the exemplary embodiment, is in the form of the guide element that is forced into the outer area 36 (which is indicated by dashed lines here) when the pressure element 32 is operated. The evanescent field is formed in this outer area 36 so that this field is interfered with on operation of the pressure element 32. The attenuation of the light propagation in the fiber 2 that results from this is detected as "switching," initiating a function that is associated with the switching. In the case of the refinement as a switching element, the optical waveguide must be in the form of a pressure sensor only in the area of the pressure element 32. In the rest of the area, the fiber 2 may be surrounded by a sheath, the so-called cladding, as in the case of a conventional optical waveguide.

To visually check whether or not the pressure sensor has responded, the pressure element 32 is in the form of an at least partially transparent or semitransparent element, which interrupts the total internal reflection on operation so that a portion of the light propagating in the fiber 2 is emitted, is passed on through the pressure element 32, and is made visible. The pressure element 32 is, thus, illuminated on operation. To increase the light intensity, the pressure element 32 is disposed opposite a reflective surface 37 so that light that is emitted downward from the fiber 2 is reflected into the pressure element 32.

Figure 10:
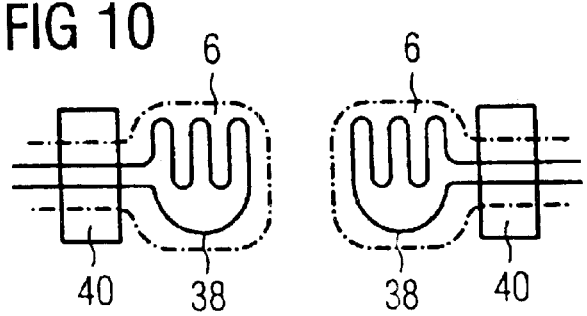
FIG. 10 is a fragmentary, diagrammatic plan view of another embodiment of the pressure sensor according to the invention with two fiber loops and deactivation elements.
Figure 10A:
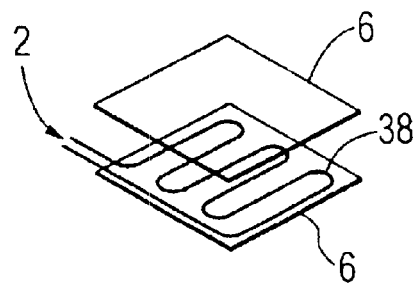
FIG. 10A is a perspective view of a flat pressure sensor with a fiber loop according to the invention.

As can be seen from FIG. 10, the pressure sensor has two fiber loops 38 so that a flat sensor element is formed overall, which has two mutually independent pressure-sensitive surfaces. Such a configuration can be used, for example, not only to identify whether a seat is occupied, but also to identify a point on the seat at which the respective person is seated. As can be seen from FIG. 10A, the fiber loop 38 is inserted between two flat fiber guides 6, in particular, plastic sheets.

The fiber loops 38 in the exemplary embodiment are each covered in the area of their input and output lines by a reflective metal foil, which is disposed on both sides of the fiber, as a deactivation element 40. The flat deactivation element 40 is disposed between the respective fiber loop 38 and the guide element 6, which, in this case, is, likewise, flat (the configuration is illustrated in FIG. 11).

Figure 11:
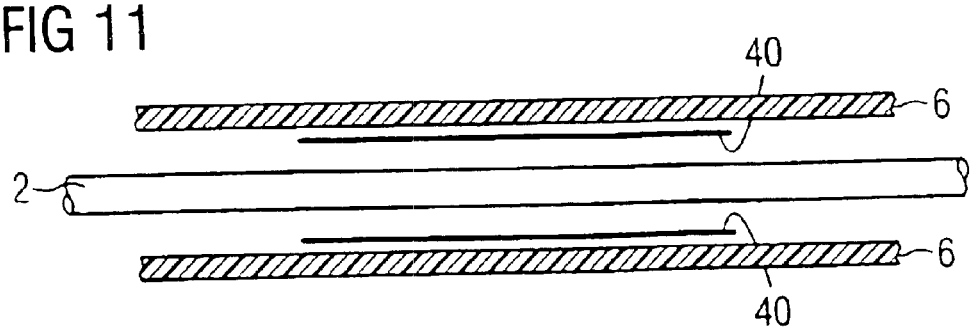
FIG. 11 is a fragmentary, cross-sectional view through a simplified pressure sensor according to the invention with deactivation elements.

The configuration of the pressure sensor illustrated in FIG. 11 can be produced particularly easily from the manufacturing point of view. In this variant, a flat foam mat or panel is provided as the fiber guide 6, that is to say, a flat element that can be elastically deformed well, which provides large-area coverage for the fiber 2, or, else, two or more fibers 2 or two or more fiber loops 38. In areas in which no sensitive function is desired, the deactivation element 40 is, likewise, disposed as a flat element between the fiber guide 6 and the fiber 2. When pressure is applied, the fiber guide merges against the fiber 2 in the area away from the deactivation element 40, due to its good elastic characteristics, where it interferes with the evanescent field. In the area of the deactivation element 40, this is pressed against the fiber, and there is no interference with the evanescent field.

Figure 12:
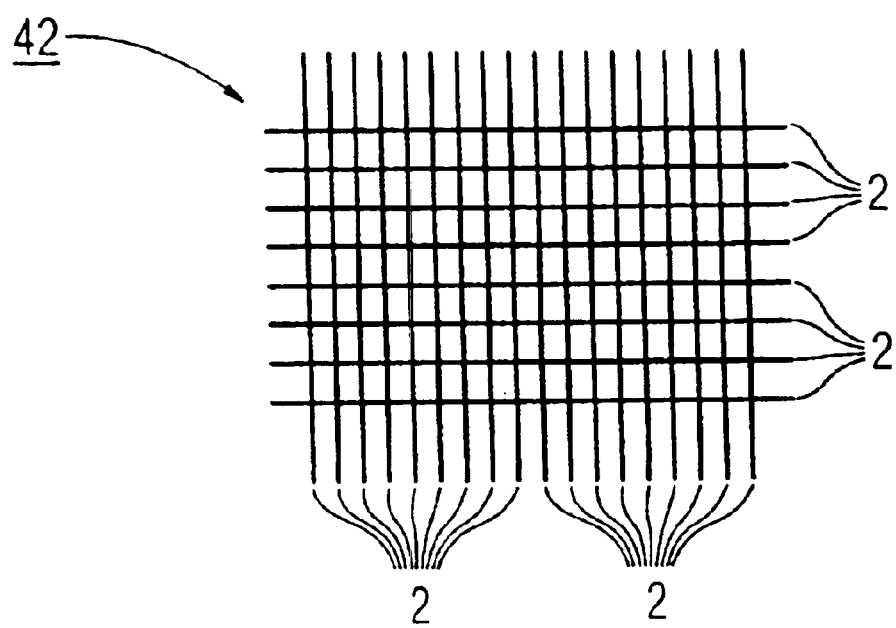
FIG. 12 is a fragmentary, diagrammatic, plan view of a further embodiment of the pressure sensor according to the invention with two or more fibers that are disposed in the form of a grating.

As can be seen in FIG. 12, a fiber grating 42 with crossing fibers 2 is provided to detect the influence of pressure as far as possible at a point, and the fibers 2 are evaluated independently of one another. A large-area element, in particular, a foam mat, is particularly suitable as the guide element (not illustrated in FIG. 12).

A virtual pressure image is, preferably, produced in conjunction with the fiber grating 42, that is to say, the pressure distribution on a surface is detected, is digitally processed and, for example, is displayed on a monitor or is printed out. The accurate position resolution with the aid of the fiber grating 42 can be used, in particular, in the automation engineering field, for example, in an automated production process, to determine the exact position of an element to be processed, on a conveyor belt that is provided with the fiber grating 42. This known position can, then, be used for accurate control of a robot arm, which is intended to be used to grip the element.

Figure 13:
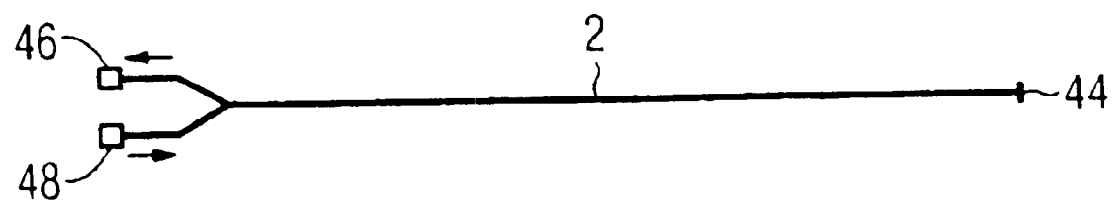
FIG. 13 is a block circuit diagram of yet another embodiment of the pressure sensor according to the invention with a reflector that is disposed at the end of the optical fiber.

A light source, for example, a light-emitting diode, through which the light is injected into the optical fiber 2, is provided in all of the exemplary embodiments. A sensor is, furthermore, provided in each case for detection of the light intensity transmitted through the fiber 2. The light source and sensor may be disposed at the respective ends of the fiber 2. As an alternative thereto, a reflector 44 may also be disposed at one end of the fiber 2, reflecting the light back into the fiber so that the sensor 46 and the light source 48 may be disposed at the same end of the fiber. This increases the sensitivity (FIG. 13). An evaluation unit is also provided for evaluation of the sensor signal. If two or more fibers 2 are used (FIGS. 10 and 12), each fiber 2 is evaluated separately.

We claim:

1. A pressure sensor, comprising:
    an optical waveguide having:
        a cladding-free optical fiber with a given refractive index;
        a flexible, tube-shaped, extruded sheath having locally limited support points;
        said optical fiber being disposed in said sheath and supporting said sheath thereon only at said locally limited support points to define an intermediate space therebetween surrounding said optical fiber;
        said optical fiber being disposed in said sheath surrounded by said intermediate space in an unloaded state of said sheath when no pressure is applied to said optical waveguide;
        a medium filling said intermediate space and surrounding said optical fiber, said medium having a refractive index less than said given refractive index; and
        said sheath being elastic and resting at least at a local point on said optical fiber when pressure is applied to said optical waveguide such that propagation of light in said optical waveguide is attenuated even without deformation of said optical fiber.

2. The pressure sensor according to claim 1, wherein said sheath has a refractive index greater than said given refractive index.

3. The pressure sensor according to claim 1, wherein said medium is gas.

4. The pressure sensor according to claim 1, wherein said gas is air.

5. The pressure sensor according to claim 1, wherein said optical fiber is at a distance of between approximately 5 $\mu$m and approximately 20 $\mu$m from said sheath in said unloaded state.

6. The pressure sensor according to claim 1, wherein pressure sensitivity of said sheath is substantially provided over an entire length of said optical fiber.

7. The pressure sensor according to claim 1, wherein said sheath has a rectangular cross-sectional area.

8. The pressure sensor according to claim 1, wherein:
    said sheath concentrically surrounds said optical fiber; and
    said locally limited support points are spacers spacing said sheath from said optical fiber.

9. The pressure sensor according to claim 1, wherein said sheath has a surface roughness ensuring formation of said intermediate space in said unloaded state.

10. The pressure sensor according to claim 1, further comprising a sealing element, said sealing element forming said sheath.

11. The pressure sensor according to claim 1, wherein:
    said optical waveguide has an end, a connecting area, and an intermediate element at said end in said connecting area between said optical fiber and said sheath; and
    said intermediate element is configured to substantially not attenuate light propagating in said optical fiber in said connecting area when pressure is applied to said connecting area.

12. The pressure sensor according to claim 1, wherein said sheath has a high optical attenuation.

13. The pressure sensor according to claim 11, wherein said intermediate element has a reflective layer.

14. The pressure sensor according to claim 13, wherein said intermediate element has a refractive index less than said given refractive index.

15. The pressure sensor according to claim 1, wherein said optical fiber is at least two separate optical fibers for position-resolved detection of pressure that is applied to said optical waveguide.

16. The pressure sensor according to claim 1, wherein said sheath is of a black material.

17. The pressure sensor according to claim 15, wherein said fibers cross one another and are disposed in a form of a grating.

18. The pressure sensor according to claim 1, further comprising a deactivation element disposed in a sub-area of said optical fiber, said deactivation element preventing attenuation of light propagating in said sub-area and suppressing a sensitivity in said sub-area of said optical fiber when pressure is applied to said sub-area.

19. The pressure sensor according to claim 18, wherein said a deactivation element is a reflective sheet.

20. The pressure sensor according to claim 1, further comprising a pressure element, said a pressure element, said waveguide, and said sheath forming a switching element.

21. The pressure sensor according to claim 20, wherein said pressure element is configured to emit a portion of the light propagating in the fiber when said pressure element is operated and make said portion of light visible.

22. A pressure sensor, comprising:
    an optical waveguide having:
        a loaded state and an unloaded state;
        a cladding-free optical fiber with a given refractive index;
        a flexible, tube-shaped, extruded sheath having support points;
        said fiber being disposed in said sheath to surround said fiber by an intermediate space in said unloaded state and to support said fiber in a locally limited manner only at said support points;
        said intermediate space containing a medium surrounding said fiber and having a refractive index less than said given refractive index; and
        said sheath being sufficiently elastic to rest on said optical fiber when pressure is applied in said loaded state and to attenuate light propagating through said fiber.

23. In combination with a motor vehicle, a pressure sensor, comprising:
    an optical waveguide having:
        a cladding-free optical fiber with a given refractive index;
        a flexible, tube-shaped, extruded sheath having locally limited support points;

said optical fiber being disposed in said sheath and supporting said sheath thereon only at said locally limited support points to define an intermediate space therebetween surrounding said optical fiber;

said optical fiber being disposed in said sheath surrounded by said intermediate space in an unloaded state of said sheath when no pressure is applied to said optical waveguide;

a medium filling said intermediate space and surrounding said optical fiber, said medium having a refractive index less than said given refractive index; and said sheath being elastic and resting at least at a local point on said optical fiber when pressure is applied to said optical waveguide such that propagation of light in said optical waveguide is attenuated even without deformation of said optical fiber.

24. The motor vehicle according to claim 23, wherein:

the motor vehicle has a pinch-protection apparatus with a sealing element; and said pressure sensor is integrated in said sealing element.

25. The motor vehicle according to claim 23, wherein:

the motor vehicle has a pinch-protection apparatus and a sealing element; and said pressure sensor is integrated in said sealing element and is a part of said pinch-protection apparatus.

26. A method for detecting pressure, comprising:

extruding a sheath into a flexible tube shape, the sheath having support points;

creating an optical waveguide by:
 placing a cladding-free optical fiber with a given refractive index into the sheath to create an intermediate space between the fiber and the sheath surrounding the fiber in an unloaded state of the waveguide; and
 supporting the fiber in the sheath in a locally limited manner only on the support points with the intermediate space being filled with a medium surrounding the fiber and having a refractive index less than the given refractive index;

injecting light into the fiber to form an evanescent field within the intermediate space in an outer area of the fiber directly adjacent the fiber;

when pressure is applied to the waveguide, moving the sheath into the outer area of the fiber to attenuate the evanescent field and, thereby, the light propagating in the fiber even without any deformation of the fiber; and detecting the attenuation of the light propagating in the fiber.

27. A method for pressure detection, which comprises:

providing an optical waveguide with a cladding-free optical fiber having a given refractive index;

surrounding the fiber on all sides in a flexible, tube-shaped, extruded sheath and an intermediate space existing in an unloaded state of the waveguide and supporting the sheath on the fiber only at locally limited support points;

surrounding the fiber in the intermediate space with a medium having a refractive index less than the given refractive index;

injecting light into the fiber to form an evanescent field within the intermediate space in an outer area of the fiber directly adjacent the fiber;

when pressure is applied to the waveguide, moving the sheath into the outer area of the fiber to attenuate the evanescent field and, thereby, the light propagating in the fiber even without any deformation of the fiber; and detecting the attenuation of the light propagating in the fiber.

* * * * *